(12) United States Patent
Sotome (10) Patent No.: US 10,080,454 B2
(45) Date of Patent: Sep. 25, 2018

(54) RETAINING DEVICE

(71) Applicant: PIOLAX, INC., Yokohama-shi (JP)

(72) Inventor: Yukihiro Sotome, Yokohama (JP)

(73) Assignee: PIOLAX, INC., Yokohama-shi, Kanagawa (JP)

( * ) Notice: Subject to any disclaimer, the term of this patent is extended or adjusted under 35 U.S.C. 154(b) by 0 days.

(21) Appl. No.: 15/532,033

(22) PCT Filed: Nov. 30, 2015

(86) PCT No.: PCT/JP2015/083528
§ 371 (c)(1),
(2) Date: May 31, 2017

(87) PCT Pub. No.: WO2016/088695
PCT Pub. Date: Jun. 9, 2016

(65) Prior Publication Data
US 2017/0265666 A1    Sep. 21, 2017

(30) Foreign Application Priority Data

Dec. 5, 2014 (JP) ................. 2014-246639

(51) Int. Cl.
*A47G 29/00* (2006.01)
*B60R 7/08* (2006.01)

(52) U.S. Cl.
CPC ............... *A47G 29/00* (2013.01); *B60R 7/08* (2013.01)

(58) Field of Classification Search
CPC ................... B60R 7/10; F16B 45/02
(Continued)

(56) References Cited

U.S. PATENT DOCUMENTS 4,720,028 A * 1/1988 Takemura ................. B60R 7/10
                                                             224/313
6,065,657 A * 5/2000 Fischer .................... B60R 7/10
                                                             224/313
(Continued)

FOREIGN PATENT DOCUMENTS

JP      2013-184575 A    11/1986
JP      S 61-190730 U    11/1986
(Continued)

OTHER PUBLICATIONS

International Search Report (ISR) (PCT Form PCT/ISA/210), in PCT/JP2015/083528, dated Mar. 1, 2016.
(Continued)

*Primary Examiner* — Eret C McNichols
(74) *Attorney, Agent, or Firm* — McGinn IP Law Group, PLLC (57) ABSTRACT

One embodiment provides a retaining device. The retaining device includes a retaining member and a case member. The retaining member has a base and a shaft that protrudes from the side of the base. The case member includes: a frame which forms an opening; a pair of side walls which are erected from both side edges of the frame; and an insertion opening which is formed between the pair of side walls for inserting the retaining member from the rear side of the case member. A shaft hole is formed in each side wall, and the shaft is inserted into the shaft holes. A first slit is formed in each side wall and located between the insertion opening and the shaft hole.

18 Claims, 8 Drawing Sheets

(58) Field of Classification Search
USPC ............... 248/294.1, 292.12, 304, 306, 322;
24/582.1, 369, 716; 16/354, 289, 63–65,
16/438, 445; 224/313, 553, 560;
185/40 H, 45; 220/264, 830, 835
See application file for complete search history.

(56) References Cited

U.S. PATENT DOCUMENTS

| | | | | |
|---|---|---|---|---|
| 6,095,469 | A * | 8/2000 | Von Alman | ............... B60R 7/10 224/313 |
| 6,457,690 | B1 * | 10/2002 | Spykerman | ............... B60R 7/10 224/313 |
| 6,663,067 | B2 * | 12/2003 | Gordon | ............... A47G 25/065 224/553 |
| 6,959,954 | B2 * | 11/2005 | Brandt | ............... B60R 7/10 224/313 |
| 6,968,601 | B2 * | 11/2005 | Bivens | ............... B60R 7/10 224/313 |
| 7,240,398 | B2 * | 7/2007 | Watanabe | ............... B60R 7/06 16/412 |
| 7,669,821 | B2 * | 3/2010 | Martin | ............... B60R 7/043 224/313 |
| 8,079,446 | B2 * | 12/2011 | Nemoto | ............... B60R 7/10 185/40 H |
| 8,186,638 | B2 * | 5/2012 | Nishida | ............... B60R 7/10 224/313 |
| 8,550,417 | B2 * | 10/2013 | Lee | ............... B60R 7/10 248/304 |
| 9,695,975 | B2 * | 7/2017 | Ogawa | ............... F16M 13/022 |
| 2007/0228702 | A1 * | 10/2007 | Ono | ............... B60R 13/0206 280/730.2 |
| 2010/0320347 | A1 * | 12/2010 | Kato | ............... B60R 7/10 248/314 |
| 2011/0035910 | A1 * | 2/2011 | Wu | ............... F16M 11/10 24/303 |
| 2017/0057418 | A1 * | 3/2017 | Shiba | ............... B60R 7/08 |

FOREIGN PATENT DOCUMENTS

| | | |
|---|---|---|
| JP | 2003-325267 A | 11/2003 |
| JP | 2010-150885 A | 7/2010 |
| JP | 2013-107566 A | 6/2013 |
| WO | WO 2014/199768 A1 | 12/2014 |

OTHER PUBLICATIONS

Japanese Office Action dated Jan. 11, 2018 with an English translation thereof.

* cited by examiner

RETAINING DEVICE

TECHNICAL FIELD

The present invention relates to a holding device for holding a given member.

BACKGROUND ART

Hook devices for hooking baggage are mounted on rear cargo chambers and back surfaces of seats of vehicles. A hanger for a vehicle disclosed in Patent Document 1 includes a housing case embedded in an inner wall surface of a vehicle interior, and a hook rotatably supported by a shaft hole of a side wall of the housing case. The hanger for a vehicle extends out of a front-side opening of the housing case in its use state while housed in the housing case with the hook rotated in its non-use state.

A retractable hanger for small articles disclosed in Patent Document 2 includes a case having a storage chamber, and a hook rotatably supported by the case. The case includes a front-side opening of the storage chamber, a flange around the opening edge, and a pair of bearing hole portions provided in both of the opposing side walls. The hook is pushed into the front-side opening of the case, while causing engage projecting shaft portions provided on both side edges of the hook with the bearing hole portions provided in the case, whereby the hook is pivotally supported by the case.

CITATION LIST

Patent Literature

Patent Document 1: JP-UM-S61-190730-A
Patent Document 2: JP-2003-325267-A

SUMMARY OF THE INVENTION

Problem that the Invention is to Solve

In the technique disclosed in Patent Document 2, the pair of shaft portions on both the side edges of the hook are disposed such that the width thereof becomes larger than the width of the front-side opening of the case, which causes the flange of the front-side opening to be insertion resistance against the shaft portions in case of the hook being inserted into the front-side opening of the case. Even though the projecting portions of the shaft portions are reduced in length in order to reduce the insertion resistance, the load bearing performance is degraded.

The present invention is made in view of the above problem, and an object of the present invention is to provide a holding device including a holding portion with enhancing load bearing performance.

Means for Solving the Problem

To solve the problem described above, one embodiment of the present invention provides
a holding device including:
a holding member arranged to hold a given member; and
a case member arranged to support the holding member,
wherein the holding member includes:
a base portion; and
shaft portions projecting from both lateral sides of the base portion,
wherein the case member includes:
a frame portion provided on a front side of the case member and defining an opening, from which the holding member is exposed;
a pair of opposing side wall portions erected from the frame portion on a back side of the opening;
an insertion opening defined between the pair of side wall portions, into which the holding member is inserted from a back side of the case member;
shaft hole portions provided in both the side wall portions, into which the shaft portions are inserted, respectively; and
slits provided in both the side wall portions between side edges of the insertion opening and the shaft hole portions.

Advantageous Effects of Invention

With the present invention, a holding device including a holding portion having improved load bearing performance can be provided.

MODE FOR CARRYING OUT THE INVENTION

Figure 1A:
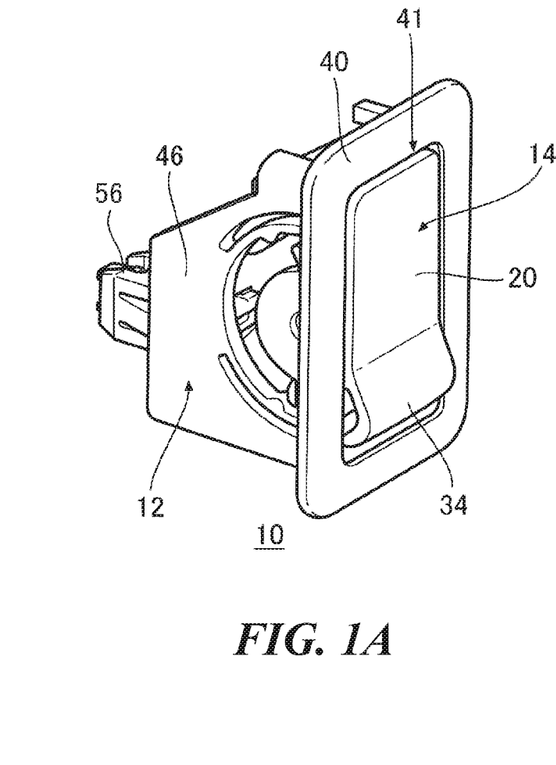
FIGS. 1A and 1B are views for illustrating a holding device according to an embodiment.
Figure 1B:
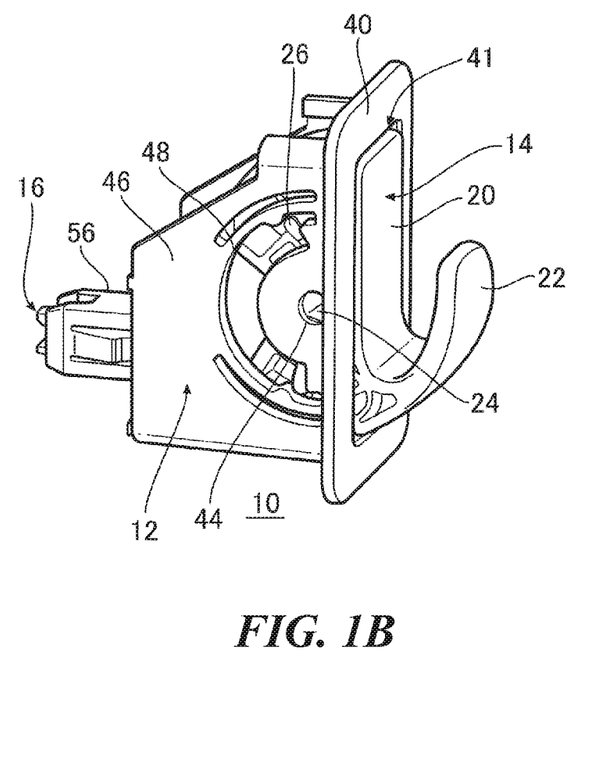
Figure 2:
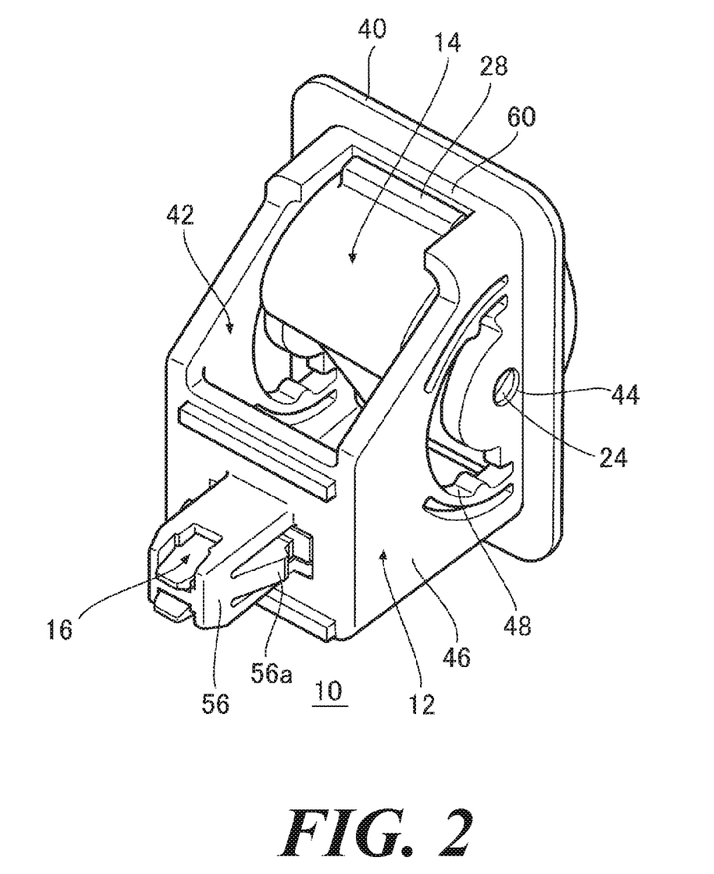
FIG. 2 is a perspective view of the holding device as viewed from a back side thereof.

FIGS. 1A and 1B are views for illustrating a holding device 10 according to an embodiment. FIG. 1A is a perspective view of the holding device 10 in the state of housing a hook portion 22, and FIG. 1B is a perspective view of the holding device 10 in a state where a hook portion 22 is out thereof. FIG. 2 is a perspective view of the holding device 10 as viewed from a back side thereof. In the present description, same or equivalent constituent elements shown in the drawings are provided with same reference numerals, and repeated descriptions of the same or equivalent constituent elements are omitted as appropriate.

As illustrated in FIG. 1B, the holding device 10 includes a hook-shaped holding member 14, and is arranged to hold baggage while a grip or handle of the baggage is hooked on the hook portion 22 of the holding member 14. The holding device 10 is mounted on a mount-base member such as a side wall of a rear cargo chamber, an inner wall of a door, and a back surface of a seat of a vehicle interior.

FIG. 1A illustrates the holding device 10 in a housing state where the hook portion 22 is not out of the holding device 10, and FIG. 1B illustrates the holding device 10 in its use state where the hook portion 22 is out of the holding device 10. In the holding device 10 in the housing state, the hook portion 22 does not extend out inside the vehicle interior, allowing the interior space of the vehicle to be used effectively. The shape of the holding member 14 is not limited to the hook shape. The holding member 14 may have other shapes as long as a baggage can be appropriately held.

The holding device 10 includes a case member 12 fixed to a vehicle body, the holding member 14 rotatably supported by the case member 12, and a pin member 16 for fixing the case member 12 to the vehicle body.

A flange-shaped frame portion 40 of the case member 12 defines an opening 41. A pair of side wall portions 46 are erected from the back surface of the frame portion 40 on the back side of the opening 41, for which shaft hole portions 44 are provided so as to rotatably support the holding member 14. The pair of side wall portions 46 are connected to each other by a connecting wall portion 54. The connecting wall portion 54 is provided with a mounting portion 56 to be fixed to a mounting hole of a vehicle body panel. Ark-shaped first slits 48 are provided in the side wall portions 46 so as to surround the shaft hole portions 44. The side wall portions 46 define a housing space for the holding member 14.

The holding member 14 is exposed from the opening 41 on the front side of the case member 12. The holding member 14 includes a rectangular column-shaped base portion 20, a pair of projection-shaped shaft portions 24 to be inserted into the shaft hole portions 44, a hook portion 22 for hooking baggage, a manipulating portion 34 to be manipulated by a user, and a pair of projection-shaped engaging portions 26 to be inserted into the first slits 48. Since the shaft portions 24 are provided on the holding member 14, the cost can be more saved as compared with an embodiment where the shaft portions 24 are separated from the holding member 14.

The pin member 16 is pushed into the mounting portion 56 to cause a pair of locking portions 56a provided on the mounting portion 56 to approach each other, whereby the locking portions 56a can be released from the state of latching onto the edge of a mounting hole of a vehicle body panel. Mounting can be made by pushing in the mounting portion 56, and the latching state can be released by pushing in the pin member 16, whereby the mounting operation and the removing operation of the holding device 10 can be facilitated.

In the present embodiment, the holding member 14 is inserted into the housing space of the case member 12 from an insertion opening 42 of the case member 12 illustrated in FIG. 2 when mounting the holding member 14 on the case member 12. The holding member 14 can be inserted from the insertion opening 42 on the back side without bending the frame portion 40 when mounting the holding member 14. Thus, the stiffness property of the frame portion 40 can be sufficiently secured, and a front surface of the frame portion 40 as the design face can be maintained in good condition. In addition, since the first slits 48 are provided in the side wall portions 46, the side wall portions 46 are bent when the shaft portions 24 pass between the side wall portions 46 during the insertion, which can reduce the insertion resistance. Thus, the load bearing performance can be improved while the shaft portions 24 can be made long. The components of the holding device 10 will be described in detail with reference to new drawings.

Figure 3A:
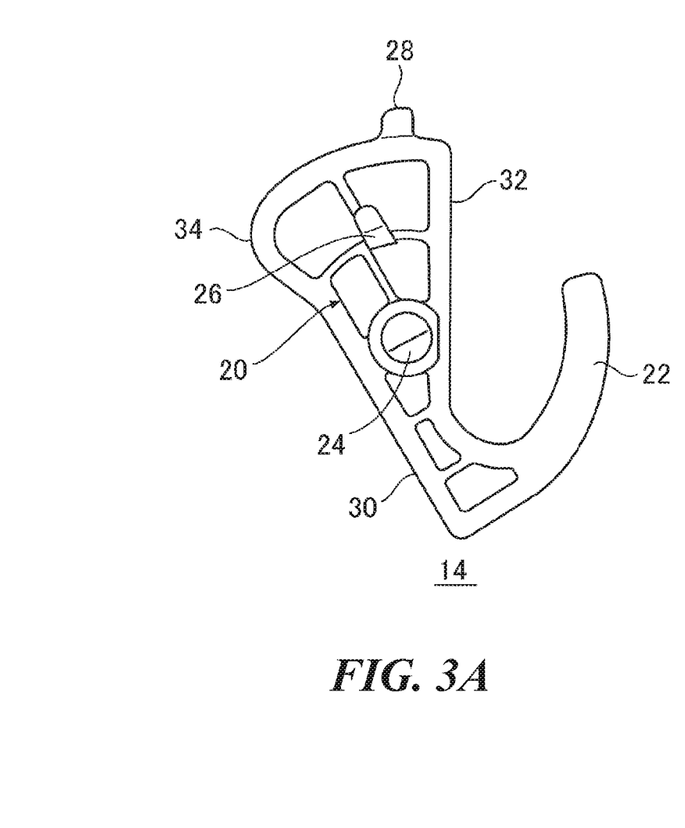
FIGS. 3A and 3B are views for illustrating a holding member.
Figure 3B:
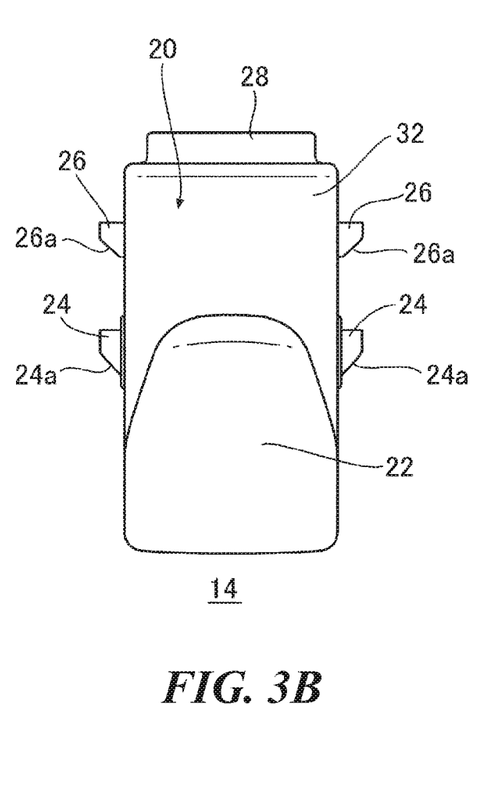

FIGS. 3A and 3B are views for illustrating the holding member 14. FIG. 3A is a side view of the holding member 14, and FIG. 3B is a front view of the holding member 14. The holding member 14 is used for hooking to hold baggage.

A first design face 30 is disposed on the back side of a second design face 32 and inclined to the second design face 32 as illustrated in FIG. 3A. The manipulating portion 34 is raised from the first design face 30 of the base portion 20. The hook portion 22 having a hook shape extends out of the second design face 32 which is the front side of the base portion 20. A rotation-controlling portion 28 having a projecting shape is provided on one end of the base portion 20 between the first design face 30 and the second design face 32.

As illustrated in FIG. 3B, the pair of shaft portions 24 coaxially project outward in the width direction from both the sides of the base portion 20, and the pair of engaging portions 26 also coaxially project from both the sides of the base portion 20. Each of the shaft portions 24 is provided with a tapered portion 24a for facilitating the mounting operation on the case member 12, and each of the engaging portions 26 is also provided with a tapered portion 26a. Since the shaft portions 24 and the holding member 14 are of a monolithic construction, the production cost can be more saved, and the mounting operation can be more facilitated as compared with a case where separate shaft portions are used.

Figure 4A:
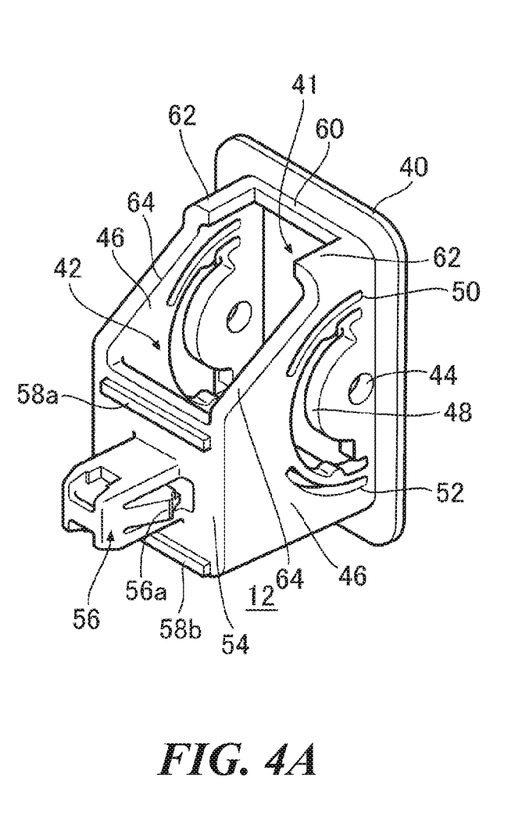
FIG. 4A is a perspective view of a case member as viewed from a back side thereof.
Figure 4B:
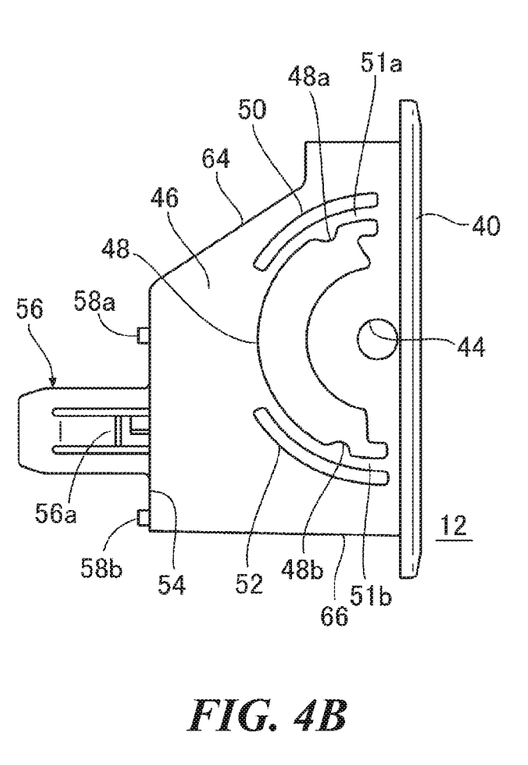
FIG. 4B is a side view of the case member.
Figure 5A:
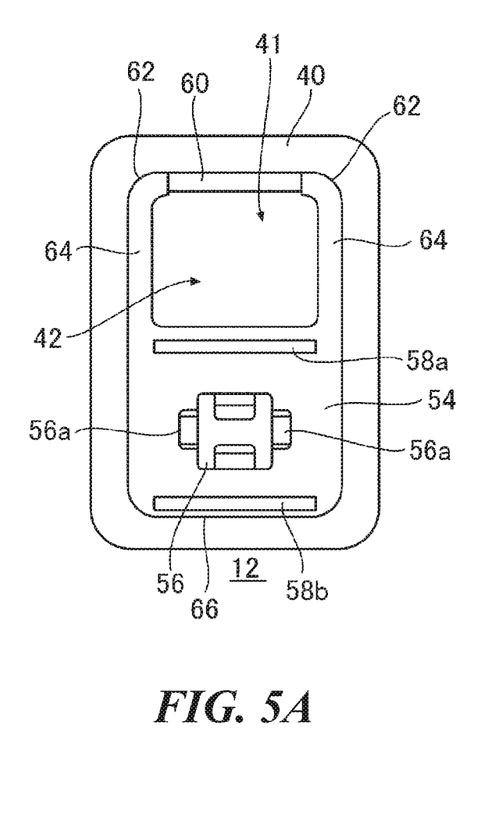
FIG. 5A is a back side view of the case member.
Figure 5B:
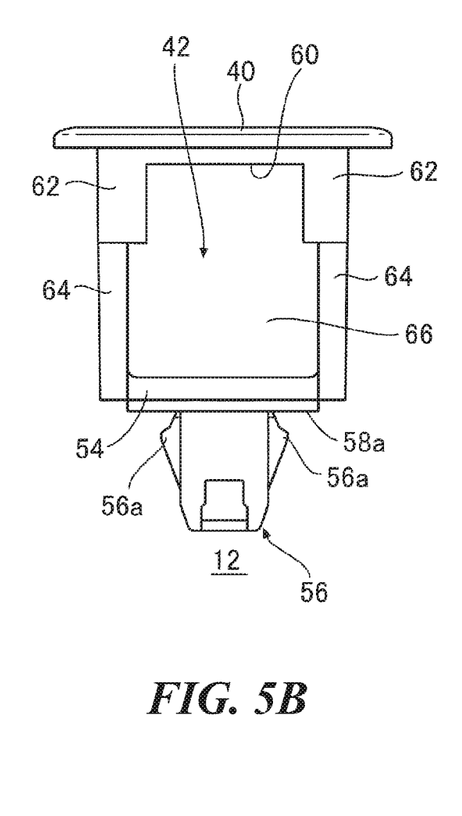
FIG. 5B is a plan view of the case member.

FIG. 4A is a perspective view of the case member 12 as viewed from a back side thereof, and FIG. 4B is a side view of the case member 12. FIG. 5A is a back side view of the case member 12, and FIG. 5B is a plan view of the case member 12. The case member 12 rotatably supports the holding member 14 and fixed to a vehicle body.

The frame portion 40 forms the rectangular opening 41, and functions as a flange to catch on the edge of a receiving hole of an interior panel. The pair of opposing side wall portions 46 are erected from the inner edges on both the sides of the frame portion 40. A bottom wall portion 66 is erected from the lower side of the frame portion 40 to be connected with the pair of side wall portions 46.

The connecting wall portion 54 has a wall shape, and is opposed to the opening 41. The connecting wall portion 54 is connected with the pair of side wall portions 46 and the bottom wall portion 66. The pair of side wall portions 46, the bottom wall portion 66, and the connecting wall portion 54 define a housing space for the holding member 14.

The mounting portion 56 is provided in order to mount the case member 12 on a mounting hole of a vehicle body panel. The mounting portion 56 has a columnar shape, and projects from the connecting wall portion 54. The pair of locking portions 56a are provided as elastic pawls on the side surfaces of the mounting portion 56 as illustrated in FIG. 4A and FIG. 5B. The pair of locking portions 56a are bendable, and arranged to latch onto the edge of a mounting hole of a vehicle body panel.

By causing the frame portion 40 to catch on the edge of a receiving hole of an interior panel and fixing the mounting portion 56 to a mounting hole of a vehicle body panel, the housing space for the holding member 14 can be disposed in the space provided between the interior panel and the vehicle body panel, whereby a space in a vehicle interior can be secured.

As illustrated in FIGS. 4A and 4B, a first rib 58a and a second rib 58b project from the connecting wall portion 54 so as to sandwich the mounting portion 56 in the up/down direction. The first rib 58a and the second rib 58b are arranged to abut on a vehicle body panel.

A pair of curved portions 62 are provided on the upper end sides of the side wall portions 46 so as to be erected from the frame portion 40. A rotation-stopping portion 60 having a rib shape is provided on the frame portion 40 on the upper edge thereof. In the use state, the rotation-stopping portion 60 functions as a stopper for stopping the rotation of the holding member 14 by receiving a torque from the holding member 14. By providing the curved portions 62 the stiffness properties of the rotation-stopping portion 60 and the frame portion 40 can be secured, and the load bearing performance can be improved.

The insertion opening 42 is provided between the upper ends of the pair of the side wall portions 46 to be inclined to the normal direction of the opening 41. Inclined sides 64 are disposed at the upper ends of the side wall portions 46 that define side edges of the insertion opening 42. By providing an inclination to the insertion opening 42, the opening area can be increased as compared with a case where the insertion opening 42 is parallel to the connecting wall portion 54 or the bottom wall portion 66. In addition, the distance from the inclined sides 64 to the shaft hole portions 44 can be decreased. The inclined sides 64 extend in a direction approaching the bottom wall portion 66 on the lower side, from the front side to the back side, that is, from the frame portion 40 side toward the connecting wall portion 54.

By providing the insertion opening 42, the holding member 14 can be inserted from the back side of the case member 12. Since the insertion opening 42 is provided separately from the opening 41 on the back side thereof, unlike the case where the holding member 14 is inserted from the opening 41, the operation of causing the shaft portions 24 of the holding member 14 to abut on the frame portion 40 to thereby push in the shaft portions 24 can be omitted. Thus, the stiffness property of the frame portion 40 can be sufficiently secured, and the load bearing performance can be improved.

The shaft hole portions 44 are provided in the side wall portions 46 at positions closer to the frame portion 40. The shaft hole portions 44 are arranged to rotatably support the pair of shaft portions 24 of the holding member 14. The first slits 48 are provided in the side wall portions 46 to penetrate therethrough. The first slits 48 has an arc shape so as to surround the shaft hole portions 44.

The second slits 50 and the third slits 52 are provided in the side wall portions 46 to penetrate therethrough. The second slits 50 and the third slits 52 are provided on outer sides of the first slits 48 in the radial direction. The second slits 50 and the third slits 52 have an arc shape along the first slits 48. The first slits 48 and the second slits 50, and the first slits 48 and the third slits 52 form first band-shaped portions 51a and second band-shaped portions 51b, respectively. By providing the slits, the first band-shaped portions 51a and the second band-shaped portions 51b can be easily bendable.

First convex portions 48a and second convex portions 48b (referred to as the "convex portions" when they are not distinguished from each other) are provided on the first band-shaped portions 51a and the second band-shaped portions 51b (referred to as the "band-shaped portions" when they are not distinguished from each other). The first convex portions 48a and the second convex portions 48b are arranged to support the engaging portions 26 of the holding member 14 at the housing positions and the use positions. The convex portions project from the edges on both the end sides of the first slits 48 toward the shaft hole portions 44 inside the first slits 48. The band-shaped portions are bent when the engaging portions 26 are engaged with the convex portions.

The first slits 48 are disposed between the insertion opening 42 and the shaft holes 44 while the second slits 50 are disposed between the first slits 48 and the insertion opening 42. Thus, the side wall portions 46 from the inclined sides 64 to the shaft hole portions 44 can be made easy to bend.

Figure 6:
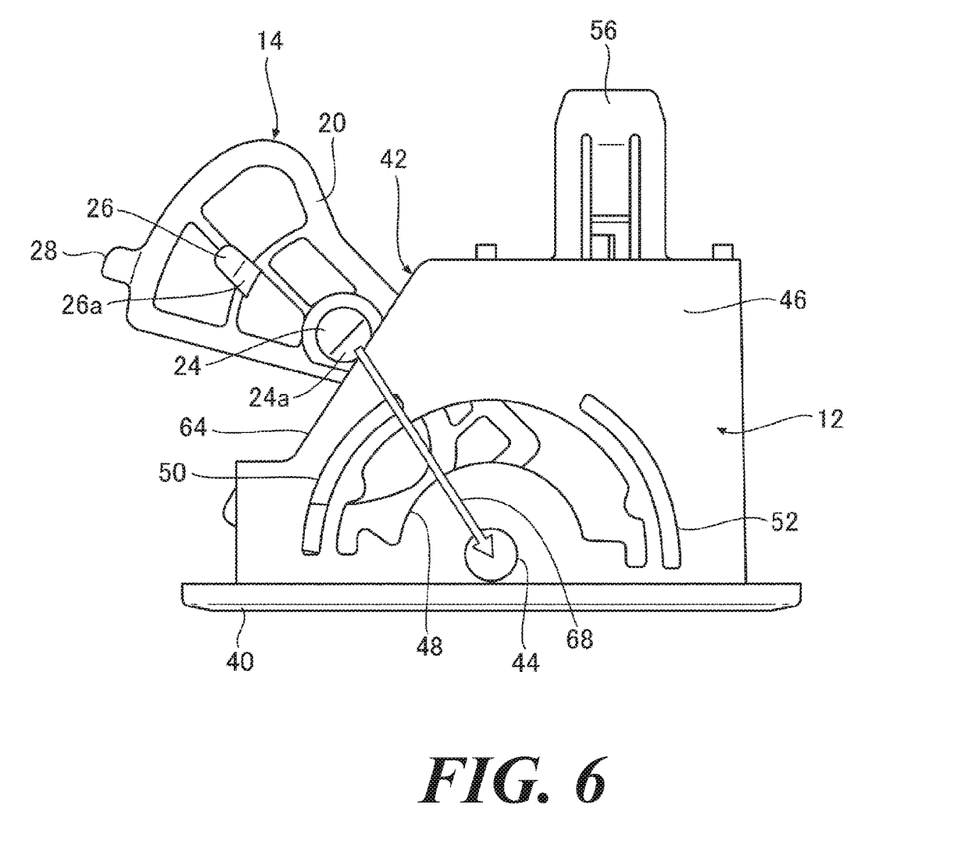
FIG. 6 is a view for illustrating a mounting process of the case member and the holding member.

FIG. 6 is a view for illustrating a mounting process of the case member 12 and the holding member 14. The holding member 14 is inserted from the insertion opening 42 of the case member 12. The pair of shaft portions 24 of the holding member 14 extend out in the width direction as illustrated in FIG. 3B. The distance between the distal ends of the pair of shaft portions 24 is larger than the opposing distance between the pair of the side wall portions 46.

The holding member 14 is inserted into the insertion opening 42 from the side of the hook portion 22, and the tapered portions 24a of the shaft portions 24 abut on the inclined sides 64 of the side wall portions 46. The holding member 14 then expands the pair of the side wall portions 46 with the tapered portions 24a of the shaft portions 24, and enters between the pair of the side wall portions 46 to be inserted thereinto. FIG. 6 illustrates a movement locus 68 of the shaft portions 24 during the mounting. The insertion opening 42, the second slits 50, the first slits 48, and the shaft hole portions 44 are disposed in this order on the movement locus 68 of the shaft portions 24.

Since the first slits 48 are disposed between the insertion opening 42 and the shaft holes 44, the side wall portions 46 between the insertion opening 42 and the shaft holes 44 can be made easy to bend, and the insertion resistance when causing the shaft portions 24 to pass between the side wall portions 46 can be reduced. In addition, the second slits 50 are disposed between the insertion opening 42 and the first slits 48. Thus, these double slits are provided between the side edges of the insertion opening 42 and the shaft holes 44. Thus, the side wall portions 46 can be made easier to bend. In addition, since the side wall portions 46 on the sides of the insertion opening 42 can be made easier to bend, the shaft portions 24 can be made long and thus the engagement allowances of the shaft portions 24 that engage with the shaft hole portions 44 can be made long, which allows the improved load bearing performance.

Figure 7A:
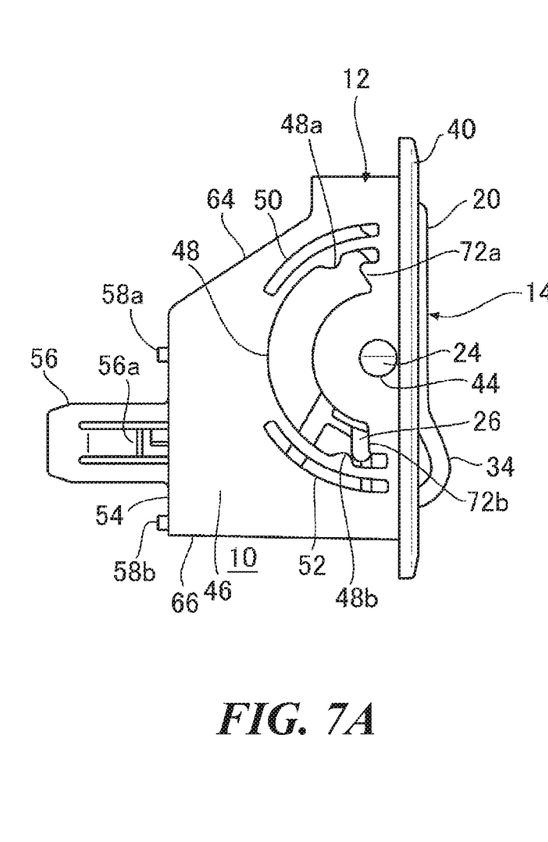
FIGS. 7A and 7B are views for illustrating the holding device in a housing state.
Figure 7B:
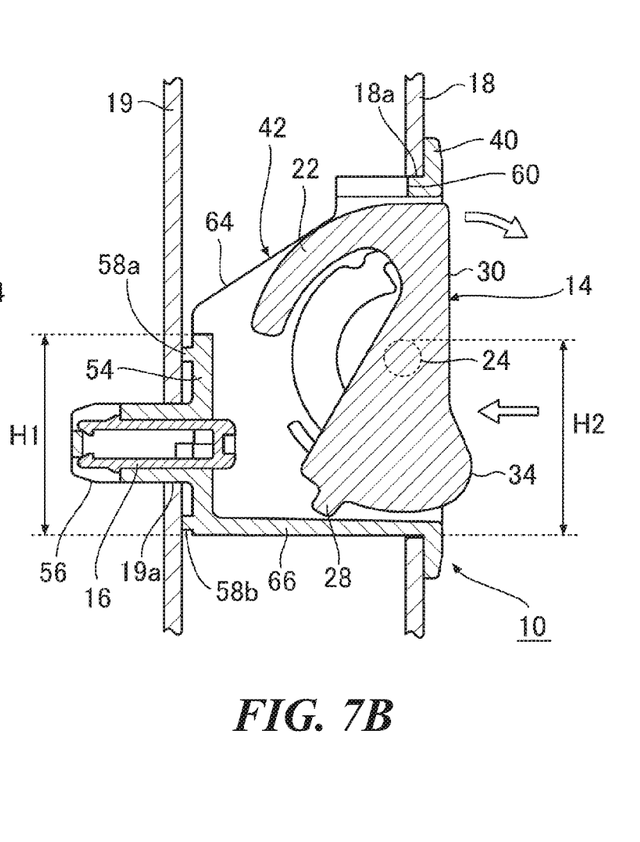
Figure 8A:
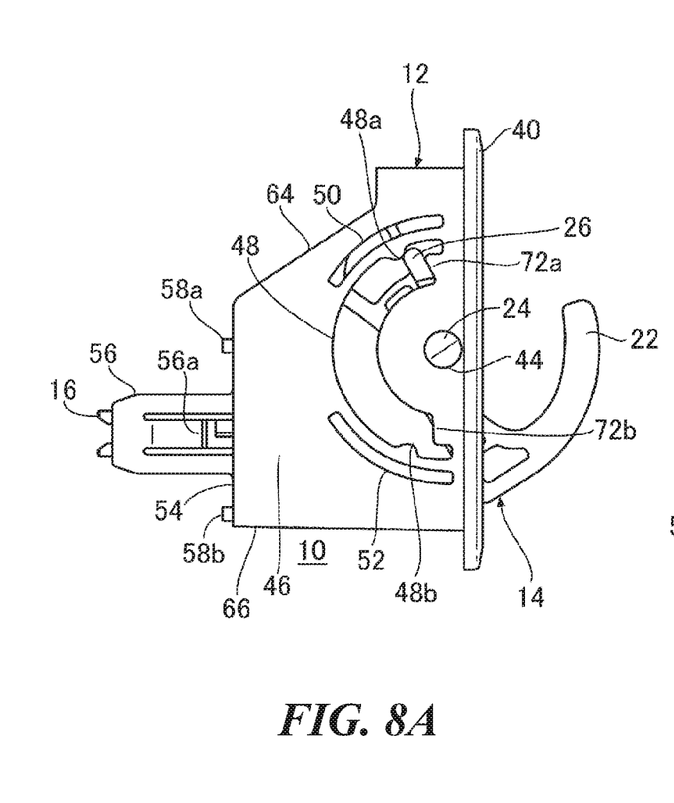
FIGS. 8A and 8B are views for illustrating the holding device in its use state.
Figure 8B:
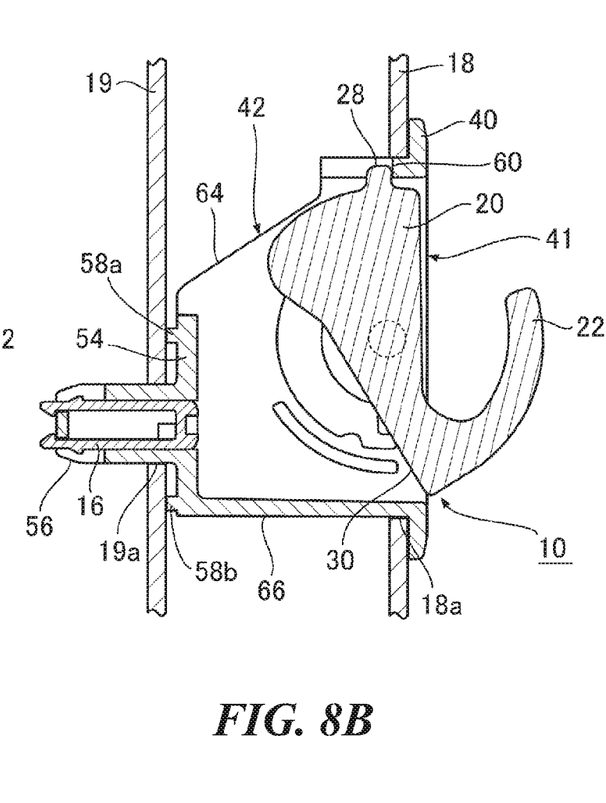

FIGS. 7A and 7B are views for illustrating the holding device 10 in the housing state. FIGS. 8A and 8B are views for illustrating the holding device 10 in its use state. FIG. 7A is a side view of the holding device 10, and FIG. 7B is a cross-sectional view of the holding device 10 and mount-base members. FIG. 8A is a side view of the holding device 10, and FIG. 8B is a cross-sectional view of the holding device 10 and mount-base members.

FIG. 7B and FIG. 8B illustrate an interior panel 18 and a vehicle body panel 19 in a state where the frame portion 40 of the holding device 10 abuts on the front edge of a receiving hole 18a of the interior panel 18 while the mounting portion 56 is inserted into a mounting hole 19a of the vehicle body panel 19.

The mounting operation and the removing operation of the holding device 10 on and from the vehicle body will be described. The pin member 16 illustrated in FIG. 7B is in the state of being yet to be pushed in while the pin member 16 illustrated in FIG. 8B is in the state of having been pushed in. An operator inserts the holding device 10 into the receiving hole 18a of the interior panel 18 and inserts the mounting portion 56 into the mounting hole 19a of the vehicle body panel 19. Thus the locking portions 56a of the mounting portion 56 latch onto the mounting hole 19a of the vehicle body panel 19, whereby the holding device 10 is completely fixed to the vehicle body. Meanwhile, the operator rotates the holding member 14 to make the first design face 30 of the holding member 14 horizontal to provide a space in the opening 41, into which an operator's finger or a tool is inserted. Then, the operator inserts his/her finger or a tool from the opening 41 to push in the pin member 16 to cause the pair of the locking portions 56a of the mounting portion 56 to approach each other, whereby the locking portions 56a can be released from the state of latching onto the edge of the mounting hole 19a of the vehicle body panel 19.

The holding device 10 can be fixed by pushing in the mounting portion 56. On the other hand, the latching state can be released by pushing in the pin member 16. Thus, the mounting operation and the removing operation of the holding device 10 can be facilitated. In addition, fixing the holding device 10 to the vehicle body panel 19 that is made from metal allows the holding device 10 to be more stably fixed thereto as compared with a case where the holding device 10 is fixed to the interior panel 18 that is made from resin.

The engaging portions 26 are sandwiched to be supported by the second convex portions 48b and second end portions 72b of the first slits 48 inside the first slits 48 as illustrated in FIG. 7A. Thus, the holding member 14 is maintained in the housed state. The engaging portions 26 move in the first slits 48 in accordance with the rotation of the holding member 14. When a user pushes the raised manipulating portion 34 against the holding member 14 in the housed state illustrated in FIG. 7B, the holding member 14 is rotated to cause the hook portion 22 to get out to be bought into the use state.

The engaging portions 26 are sandwiched to be supported by the first convex portions 48a and first end portions 72a of the first slits 48 as illustrated in FIG. 8A. Thus, the rotation of the holding member 14 in the use state is controlled. The rotation-controlling portion 28 abuts on the rotation-stopping portion 60 on the upper edge of the frame portion 40 as illustrated in FIG. 8B. Thus, the load applied to the hook portion 22 of the holding member 14 can be received by the rotation-stopping portion 60 and the first end portions 72a. Since the holding member 14 can be mounted without causing the shaft portions 24 of the holding member 14 to pass through the frame portion 40, the stiffness property of the frame portion 40 can be sufficiently secured, and the load bearing performance can be improved. In addition, since the shaft portions 24 pass between the side wall portions 46 that are made easy to bend by providing the slits thereto, the shaft portions 24 can be made long in the axial direction so as to be hooked sufficiently on the shaft hole portions 44 to improve the load bearing performance.

The width of the first slits 48 is larger than the width of the second slits 50 and the width of the third slits 52 as illustrated in FIG. 7A. Thus, the engaging portions 26 to be inserted into the first slits 48 can be increased in size to have improved load bearing performance in the use state.

The height H1 of the connecting wall portion 54 is larger than the height H2 from the bottom wall portion 66 to the shaft portions 24 as illustrated in FIG. 7B. Thus, the distance between the first rib 58a and the second rib 58b can be sufficiently secured to be stably fixed to the vehicle body panel 19.

The first slits 48 extend from the second end portions 72b, which define the engagement positions of the engaging portions 26, to positions closer to the frame portion 40, and the third slits 52 that are along the first slits 48 also extend from the engagement positions of the engaging portions 26 to positions closer to the frame portion 40, as illustrated in FIG. 7A. Thus, the second convex portions 48b can be made easy to bend, which can reduce deterioration with time caused by the use. In a similar manner to the case on the second end portions 72b, the first slits 48 and the second slits 50 extend from the engagement positions of the engaging portions 26 to positions closer to the frame portion 40 also on the sides of the first end portions 72a as illustrated in FIG. 8A.

The present invention is not limited to the embodiment described above, and modifications such as various kinds of design changes to the embodiment can be made based on the knowledge of those skilled in the art. Such modified embodiments will also fall within the scope of the present invention.

While the convex portions are provided on the band-shaped portions as engage-receive portions to be engaged with the engaging portions 26 in the embodiment, the present invention is not limited to the embodiment. For example, instead of convex portions, concave portions may be provided in the band-shaped portions as the engage-receive portions, and the concave portions may be engaged with the engaging portions 26 of the holding member 14.

While the second slits 50 and the third slits 52 are provided in the outer sides of the first slits 48 in the radial direction in the embodiment, the present invention is not limited to the embodiment. For example, ark-shaped second slits and third slits may be provided between the first slits 48 and the shaft hole portions 44, band-shaped portions may be provided on the inner sides of the first slits 48 in the radial direction, and convex portions projecting in directions away from the shaft hole portions 44 may be provided on the band-shaped portions.

While the insertion opening 42 is provided ranging from the upper surface side of the case member 12 to the connecting wall portion 54 in the embodiment, the present invention is not limited to the embodiment. For example, an insertion opening may be provided ranging from the lower surface side of the case member 12 to the connecting wall portion 54. In the modification where the insertion opening is provided on the lower surface side, an upper wall surface is provided on the case member 12, and the connecting wall portion 54 leads to the upper wall surface. Also in this case, since the third slits 52 and the first slits 48 are provided between the insertion opening and the shaft hole portions 44, the side wall portions 46 can be made easy to bend.

DESCRIPTION OF REFERENCE NUMERALS AND SIGNS

10 Holding device,
12 Case member,
14 Holding member,
16 Pin member,
18 Interior panel,
18a Receiving hole,
19 Vehicle body panel,
19a Mounting hole,
20 Base portion,
22 Hook portion,
24 Shaft portion,
24a Tapered portion,
26 Engaging portion,
26a Tapered portion,
28 Rotation-controlling portion,
30 First design face,
32 Second design face,
34 Manipulating portion,
40 Frame portion,
41 Opening,
42 Insertion opening,
44 Shaft hole portion,
46 Side wall portion,
48 First slit, 48a First convex portion,
48b Second convex portion,
50 Second slit,
51a First band-shaped portion,
51b Second band-shaped portion,
52 Third slit,
54 Connecting wall portion,
56 Mounting portion,
56a Locking portion,
58a First rib,
58b Second rib,
60 Rotation-stopping portion,
62 Curved portion,
64 Inclined side, and
66 Bottom wall portion.

INDUSTRIAL APPLICABILITY

The present invention relates to a holding device for holding a given member.

The invention claimed is:

1. A holding device including:
a holding member arranged to hold a given member; and
a case member arranged to support the holding member,
wherein the holding member includes:
  a base portion; and
  shaft portions projecting from both lateral sides of the base portion, and
wherein the case member includes:
  a frame portion provided on a front side of the case member and defining an opening, from which the holding member is exposed;
  a pair of opposing side wall portions erected from the frame portion on a back side of the opening;
  an insertion opening defined between the pair of side wall portions, into which the holding member is inserted from a back side of the case member;
  shaft hole portions provided in both the side wall portions, into which the shaft portions are inserted, respectively; and
  slits provided in both the side wall portions between side edges of the insertion opening and the shaft hole portions, the holding member including engaging portions that are movable within the slits.

2. The holding device of claim 1,
wherein the slits are double slits disposed between the side edges of the insertion opening and the shaft hole portions.

3. The holding device of claim 1,
wherein the insertion opening is inclined with respect to a normal direction of the opening.

4. The holding device of claim 1,
wherein the case member further includes engage-receive portions provided on edges of the slits to support the engaging portions in an engaged manner.

5. The holding device of claim 1, wherein the slits comprise arc-shaped slits formed around a part of the shaft hole portions, respectively.

6. The holding device of claim 1, wherein the holding member further comprises:
a manipulating portion which is raised from a first face of the base portion;
a hook portion that extends out of a second face of the base portion; and
a rotation-controlling portion projecting from an end of the base portion between the first and second faces of the base portion.

7. The holding device of claim 1, wherein the shaft hole portions of the case member rotatably support the shaft portions of the holding member.

8. The holding device of claim 1, further comprising:
a pin member for fixing the case member to a vehicle body.

9. The holding device of claim 8, wherein the case member further comprises:
a connecting wall portion which connects the pair of opposing side wall portions; and
a mounting portion having a columnar shape, which projects from the connecting wall portion and is fixable inside a mounting hole.

10. The holding device of claim 9, wherein the mounting portion comprises a pair of locking portions, and the pin member is pushed into the mounting portion to cause the pair of locking portions to approach each other to release the pair of locking portions from a latching state.

11. The holding device of claim 9, wherein the pair of locking portions are bendable and formed as elastic pawls on a side surface of the mounting portion.

12. The holding device of claim 1, wherein the side wall portions are bendable to allow the shaft portions of the holding member to pass between the side wall portions during insertion of the holding member into the insertion opening.

13. The holding device of claim 1, wherein each of the shaft portions includes a tapered portion to facilitate mounting in the case member, and each of the engaging portions includes a tapered portion.

14. The holding device of claim 1, wherein the shaft hole portions are formed in the side wall portions between the frame portion and the slits, respectively.

15. The holding device of claim 1, wherein the case member further comprises other slits formed in the side wall portions, respectively, the other slits comprising arc-shaped slits formed along the slits and on a side of the slits which is opposite the shaft hole portions.

16. The holding device of claim 15, wherein the side wall portions comprise band-shaped portions formed between the slits and the other slits, respectively, and the band-shaped portions comprise convex portions projecting from an edge of the slits toward the shaft hole portions, respectively.

17. The holding device of claim 16, wherein the band-shaped portions are bendable when the engaging portions are engaged with the convex portions.

18. A holding device including:
a holding member arranged to hold a given member; and
a case member arranged to support the holding member,
wherein the holding member includes:
  a base portion; and
  shaft portions projecting from both lateral sides of the base portion,
wherein the case member includes:
  a frame portion provided on a front side of the case member and defining an opening, from which the holding member is exposed;
  a pair of opposing side wall portions erected from the frame portion on a back side of the opening;
  an insertion opening defined between the pair of side wall portions, into which the holding member is inserted from a back side of the case member;
  shaft hole portions provided in the side wall portions, into which the shaft portions are inserted, respectively;

slits provided in the side wall portions between side edges of the insertion opening and the shaft hole portions; and other slits provided in the side wall portions, the other slits being formed on a side of the slits which is opposite the shaft hole portions.

* * * * *